United States Patent
Harper et al.

(10) Patent No.: US 8,938,993 B2
(45) Date of Patent: Jan. 27, 2015

(54) GLASS STRENGTHENING AND PATTERNING METHODS

(75) Inventors: David C. Harper, Kingston, TN (US); Andrew A. Wereszczak, Oak Ridge, TN (US); Chad E. Duty, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 934 days.

(21) Appl. No.: 12/957,202

(22) Filed: Nov. 30, 2010

(65) Prior Publication Data

US 2012/0131960 A1 May 31, 2012

(51) Int. Cl.
*C03B 27/00* (2006.01)
*C03B 27/012* (2006.01)
*C03C 23/00* (2006.01)

(52) U.S. Cl.
CPC ............. *C03B 27/012* (2013.01); *C03C 23/006* (2013.01)
USPC .......................................................... 65/114

(58) Field of Classification Search
CPC ...... C03B 27/00; C03B 27/012; C03C 23/006
USPC ........... 65/436, 507–509, 510, 529, 111, 114, 65/116, 157, 182.1, 182.3
See application file for complete search history.

(56) References Cited

U.S. PATENT DOCUMENTS

| | | | | |
|---|---|---|---|---|
| 5,091,003 A | * | 2/1992 | Boaz | 106/31.05 |
| 5,234,484 A | * | 8/1993 | Toch et al. | 65/117 |
| 5,235,662 A | * | 8/1993 | Prince et al. | 385/129 |
| 5,489,558 A | * | 2/1996 | Moffatt et al. | 501/69 |
| 5,653,838 A | * | 8/1997 | Hwang et al. | 156/104 |
| 6,066,516 A | * | 5/2000 | Miyasaka | 438/149 |
| 6,204,483 B1 | * | 3/2001 | Fair et al. | 219/388 |
| 6,236,021 B1 | * | 5/2001 | Fair et al. | 219/388 |
| 6,513,435 B2 | * | 2/2003 | Detzner | 101/487 |
| 2006/0112729 A1 | * | 6/2006 | Sakoske | 65/106 |
| 2010/0009154 A1 | * | 1/2010 | Allan et al. | 428/220 |

OTHER PUBLICATIONS

Barsom, J. M., "Fracture of Tempered Glass," J. Am. Cer. Soc., vol. 51, No. 2, pp. 75-78 (Feb. 1968).*
Wereszczak, A. A. et al., "ORNL Quasi-Static Mechanical Characterization and Analysis: FY09 Annual Report to TARDEC," ORNL/TM-2009/234, 119 pages (Dec. 2009).*
Wereszczak, A.A., et al. "Glass Strengthening via High-Intensity Plasma-Arc Heating," J. Am. Cer. Soc., vol. 93, No. 5, pp. 1256-1259 (May 2010).*
Ott, Ronald, "Pulse-Thermal Processing for Electronic Applications", Jun. 2006, JOM, p. 31, retrieved from: http://download.springer.com/static/pdf/931/art%253A10.1007%252Fs11837-006-0176-8.pdf?auth66=1403887229_7b5ad8fb4878ade0adb4026d39b1e65f&ext=.pdf on Jun. 25, 2014.*

(Continued)

*Primary Examiner* — Richard Crispino
*Assistant Examiner* — Yana B Krinker
(74) *Attorney, Agent, or Firm* — Klarquist Sparkman, LLP

(57) ABSTRACT

High intensity plasma-arc heat sources, such as a plasma-arc lamp, are used to irradiate glass, glass ceramics and/or ceramic materials to strengthen the glass. The same high intensity plasma-arc heat source may also be used to form a permanent pattern on the glass surface—the pattern being raised above the glass surface and integral with the glass (formed of the same material) by use of, for example, a screen-printed ink composition having been irradiated by the heat source.

14 Claims, 12 Drawing Sheets

(56) References Cited

OTHER PUBLICATIONS

Akcakaya, R. et al., "Fatigue Behavior of Surface Flaws on Air vs. Tin Side of Soda-Lime-Silica Float Glass"; Paper T4.3 in *Glass in the New Millennium: Challenges and Break-Through Technologies*, Proceedings of the ICG Annual Meeting 2000 (Amsterdam, The Netherlands), National Committee Netherlands Glass Industry (NCNG) (May 15-17, 2000).

Fabes, B. D. et al., "Strengthening of Glass by Sol-Gel Coatings," *J. Am. Cer. Soc.*, vol. 73, No. 4, pp. 978-988 (Apr. 1990).

Fletcher. P. C. et al., "Effect of Silicone Quenching and Acid Polishing on the Strength of Glass," *J. Am. Cer. Soc.*, vol. 47, No. 8, pp. 379-382 (Aug. 1964).

Green, D. J., "Compressive Surface Strengthening of Brittle Materials by a Residual Stress Distribution," *J. Am. Cer. Soc.*, vol. 66, No. 11, pp. 807-810 (Nov. 1983).

Hand, R. J. et al., "Glass Strengthening Using Ormosil Polymeric Coatings," *J. Sol-Gel Sci. Tech.*, vol. 13, Nos. 1-3, pp. 695-699 (Jan. 1998).

Krohn, M. K. et al., "Biaxial Flexure Strength and Dynamic Fatigue of Soda-Lime-Silica Float Glass," *J. Am. Cer. Soc.*, vol. 85, No. 7, pp. 1777-1782 (Jul. 2002).

LaCourse, W. C., "How Surface Flaws Affect Glass Strength," *Glass Ind.*, vol. 68, No. 7, pp. 14-23 (Jun. 1987).

Mould, R. E., "Strength and Static Fatigue of Abraded Glass Under Controlled Ambient Conditions: III, Aging of Fresh Abrasions," *J. Am. Cer. Soc.*, vol. 43, No. 7, pp. 160-167 (Jul. 1960).

Nordberg, M. E. et al., "Strengthening by Ion Exchange," *J. Am. Cer. Soc.*, vol. 47, No. 8, pp. 215-219 (Aug. 1964).

Quinn, G. D., "Weibull Strength Scaling for Standardized Rectangular Flexure Specimens," *J. Am. Ceram. Soc.*, vol. 86, No. 3, pp. 508-510 (Mar. 2003).

Rivard, J. D. K. et al., "The Use of High Density Infrared Heating for Surface Modification/Coatings Processes," *Proc. 18th Int. Conf. Surf. Mod. Tech.*, pp. 139-146 (2006).

Sozanski, M. R. et al. "Strengthening of Glass Tubes and Containers by Flame-Sprayed Glazing," *Am. Cer. Soc. Bull.*, vol. 66, No. 11, pp. 1630-1634 (Nov. 1987).

"Standard Test Method for Flexural Strength of Advanced Ceramics at Ambient Temperature," ASTM C1161, vol. 15.01, ASTM International, West Conshohocken, Pennsylvania (2008).

"Standard Test Method for Monotonic Equibiaxial Flexure Strength of Advanced Ceramics at Ambient Temperature," ASTM C1499, vol. 15.01, ASTM International, West Conshohocken, Pennsylvania (2008).

Tummala, R. R. et al., "Strength and Dynamic Fatigue of Float Glass Surfaces," *J. Am. Cer. Soc.*, vol. 58, Nos. 3-4, pp. 156-157 (Mar. 1975).

Wereszczak, A. A., "Elastic Property Determination of WC Spheres and Estimation of Compressive Loads and Impact Velocities That Initiate Their Yielding and Cracking," *Cer. Eng. Sci. Proc.*, vol. 27, No. 7, pp. 211-223 (2006).

Wereszczak, A. A. et al., "Glass Strengthening via High-Intensity Plasma-Arc Heating," *J. Am. Ceram. Soc.*, vol. 93, No. 5, pp. 1256-1259 (May 2010).

Wereszczak, A. A. et al., "Strength and Contact Damage Responses in a Soda-Lime-Silicate and a Borosilicate Glass," Paper FP-05, 25th Army Sci. Conf., Orlando, FL (Nov. 27-30, 2006).

Yashchishin, I. N. et al., "Strengthening Glass Containers by a Thermochemical Flame Method," *Glass Cer.*, vol. 46, No. 1, pp. 7-9 (Jan. 1989).

Zuccelli, P., "Oxycombustion for Glass Conditioning and Fire Polishing," *Int. Glass J.*, 133, pp. 26-31 (month unknown, 2004).

\* cited by examiner

Dimensions are in millimeters

Dimensions are in millimeters

GLASS STRENGTHENING AND PATTERNING METHODS

ACKNOWLEDGMENT OF GOVERNMENT SUPPORT

This invention was made with government support under DE-AC05-00OR22725 awarded by the Department of Energy. The government has certain rights in the invention.

FIELD

Disclosed are methods for strengthening and patterning glass, glass ceramics and other materials using a high-intensity plasma-arc heat source.

BACKGROUND

Improving the flexure strength of transparent glass and glass ceramics concomitantly improves the strength-to-failure and therefore increases the time of projectile-target interaction and improves ballistic resistance. The ubiquitous presence of surface flaws limits the strength of glass articles. No method exists for completely overcoming these flaws. However, there are several processes that are known to increase the flexure strength of glass. Under an applied tensile stress, all act to lessen the stress concentration of surface-located flaws. Some such strengthening processes include ion-exchange methods involving molten salts, acid etching, annealing and tempering, storing glass in water, application of inorganic or organic coatings and the use of flame-sprayed glazing and flame-sprayed gas reagents. These strengthening methods require either the use of chemicals, time-consuming and carefully controlled thermal processing, a service condition that the glass is not likely to experience (i.e., constant submersion in water), the deposition of a coating that might not withstand impact conditions or that may affect transparency, or combinations thereof.

Another process to lessen stress concentrations on glass surfaces is fire polishing. A flame is used to provide rapid, short term, and intense heating on a glass surface. This causes a reduction of the glass viscosity in that location and surface-tension stress concentrators (e.g., surface flaws, edges, etc.) are reduced. An oxy-combustion process can be used to accomplish fire polishing but it has its disadvantages. Natural gas is needed for the burners and positioning of the burners relative to the glass surface is difficult due to environmental effects such as gravity and convection. Thus, fluctuations in the flame heat makes positioning of the flame relative to the glass difficult—if the burners are positioned too far away from the glass, considerable amounts of energy is wasted and processing costs are high; if the burners are too close, then the flame temperature may not be optimized and soot could also be deposited on the glass. Methods that can be used to strengthen glass, glass ceramics and related materials on a commercial scale—that is used for mass production in an economically viable manner—are needed.

SUMMARY

Disclosed are methods for strengthening glass, glass ceramics and other materials using a plasma-arc heat source. The methods can be used on a mass production scale and in a relatively safe, environmentally friendly and economically viable manner.

The plasma-arc heating methods provide rapid heating and cooling, precise temperature control, instantaneous starting and stopping, do not rely on the use of chemicals or gases (therefore do not generate waste by-product such as noxious fumes or deposit soot), are amenable for processing large quantities of glass, and can be used by glass manufacturers or by the end users.

The disclosed methods significantly improve the strength of glass without compromise to the quality of visible wavelength transparency. The plasma-arc heating locally modifies the surface and edges of glass through intense heating. This lessens the activity and stress-intensity of surface- and edge-located "flaws" resulting in higher strength and greater strain tolerance of the glass. The disclosed methods are safer to use as compared to current commercial processes, especially in a commercial-scale production, and are amenable for treating large amounts of glass in a short period of time, minimizing cost as well.

In certain embodiments the disclosed methods include providing a plasma-arc heat source capable of delivering a power density of at least 900 $W/cm^2$ in less than one second. The glass is irradiated using the plasma-arc heat source thereby inducing glass strengthening. Providing such intense heating on a surface of the glass in less than a second produces surface flaw healing without heating or affecting the majority of the glass.

In one embodiment, a method for strengthening glass comprises providing a soda-lime silicate glass have a first surface comprising a tin side, a second surface comprising an air side and edges, cleaning the glass using an alcohol, providing a plasma-arc heat source capable of delivering a power density of at least 900 $W/cm^2$ in less than one second, unidirectionally translating the glass under the plasma-arc heat source at a speed of 8 mm/s, irradiating the first surface of the glass with the plasma-arc heat source at a power density of 900 $W/cm^2$ and quenching the glass following irradiation, thereby increasing an equibiaxial failure stress of the glass by 25% or more and a uniaxial 4-point-bend failure stress by 65% or more. In this particular embodiment the glass may effectively be irradiated a small portion at a time using a plasma-arc heating source having a lamp configuration of 10 cm-wide, 20 cm-wide, 35 cm-wide or other such configurations. The time period and translation speed for irradiating a glass or glass ceramic will depend on the type of the glass or glass ceramic material being treated, its thickness, and size, as can be determined by one of ordinary skill in the art with reference to this disclosed invention.

In another embodiment, a method for strengthening glass comprises providing a glass have a first surface and a second surface and irradiating the first surface of the glass with a plasma-arc heat source at a power density of at least 900 $W/cm^2$ thereby increasing a equibiaxial failure stress of the glass and a uniaxial 4-point-bend failure stress of the glass.

Also disclosed are methods for patterning glass, glass ceramics and like materials, using a plasma-arc heat source. In certain embodiments the method combines the deposition of patterned, multifunctional-capable inks or pastes onto glass or glass ceramic materials and rapid high-temperature exposure using a plasma-arc heat source. In certain embodiments the patterning method comprises screen printing patterned deposition of the ink or paste on the glass. The inks or pastes may comprise a composition that becomes a permanent, multifunctional coated pattern on the glass surface after heating (e.g., electrical conduction, residual-stress-causing, structure-stiffening, crack-arresting, magnetic, thermoelectric, piezoelectric) or may comprise ink or paste compositions that have high emissivity (e.g., are organic-based) that permanently embed a chosen pattern onto the glass surface after heating. A plasma-arc heat source heats the ink or paste compositions extremely rapidly (relatively to the transparent substrate) without degrading or significantly altering the (substrate) glass. The ink and/or paste composition on the glass surface locally heats the glass thereunder producing the mark image as a raised pattern on the glass surface. The image forms a slightly raised portion relative to its native surface in the pattern previously made by the ink or paste composition, potentially due to a change in the density of the glass that was under the pattern or other glass modifications.

The patterning methods enable multi-functionality marking on glass, such as a pattern comprising a Universal Product Code, model numbers, words, etc., to be permanently incorporated onto the surface of glass or glass ceramics or ceramics. This is accomplished through the patterned deposition (e.g., screen printing) of multifunctional inks or pastes onto glass or glass ceramic or ceramic materials and high-density infrared heat irradiating the patterned glass with the plasma-arc heat source. The multi-functionality could also be in the form of electrically-conductive, magnetic, thermoelectric, residual-stress-causing, crack-pattern-altering, structure-stiffening, light-diffraction-causing, and piezoelectric patterned coatings or create topographies that are permanently and integrally part of the surface of glass.

An embodiment of the glass patterning method comprises providing a soda-lime silicate glass have a first surface, a second surface and edges, forming a first pattern of graphitic ink on the first surface of the glass using a screen printing method, providing a plasma-arc heat source capable of delivering a power density of at least 900 W/cm$^2$ in less than one second, unidirectionally translating the glass under the plasma-arc heat source at a speed of 8 mm/s, and irradiating the first surface of the glass with the plasma-arc heat source at a power density of 900 W/cm$^2$ and substantially simultaneously evolving the ink thereby forming a second pattern on the first surface of the glass wherein the second pattern comprises a glass material raised from the first surface of the glass, the second pattern corresponding to the first pattern.

In another embodiment, the glass patterning method comprises patterning a glass or glass ceramic sample by forming a first pattern of ink on a first surface of the glass and irradiating the first surface of the glass with a plasma-arc heat source at a power density of 900 W/cm$^2$ thereby forming a second pattern on the first surface of the glass wherein the second pattern comprises a glass material raised from the first surface of the glass, the second pattern corresponding to the first pattern.

The foregoing and other objects, features, and advantages of the invention will become more apparent from the following detailed description, which proceeds with reference to the accompanying figures.

DETAILED DESCRIPTION

Figure 1A:
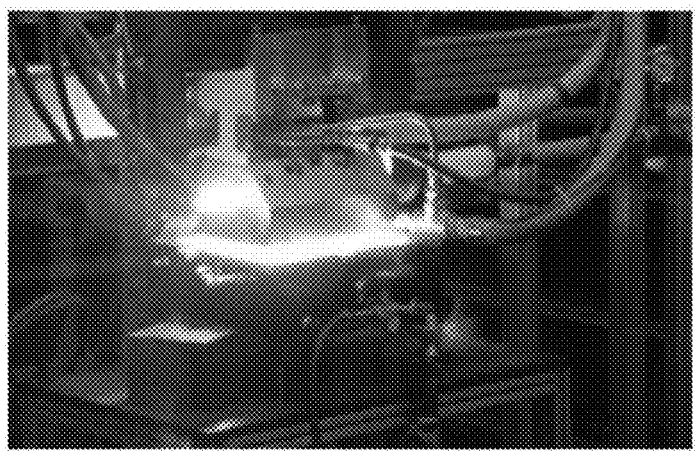
FIG. 1a-1c are illustrations of a plasma-arc lamp/heat source utilized in a disclosed embodiment of the invention.

The presently disclosed methods produce strengthening in glass using plasma-arc heating. Certain embodiments produce very rapid heating and cooling, precise temperature control, instantaneous starting and stopping, do not rely on the use of chemicals or gases (such as gas used for fire polishing processes) and therefore generate no waste byproduct such as noxious fumes or toxic or harsh chemical waste and do not produce soot deposits, is amenable for processing large quantities of glass (industrial-scale production), useful for a glass manufacturer and/or an end user.

The presently disclosed methods increase the flexure strength of glass by heat-treating it with a high-intensity plasma-arc heat source or a like energy source. In certain embodiments, the equibiaxial failure stress of the glass is increased by 25% or more and uniaxial 4-point-bend failure stress is increased by 65% or more. Certain embodiments of the disclosed plasma-arc heat treatment methods produce flaw healing that, at least in part, strengthens the glass product. In addition, certain embodiments result in a change-in-location of the strength-limiting flaws in a four-point-bend of the glass where failure initiation occurs on the gage section surface for treated glass but occurs at a gage section edge for untreated glass.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

The disclosed method utilizes a plasma-arc heat source for producing strengthened glass. As used herein "plasma-arc heat source" means a heat source capable of controllably and repeatedly applying a power density of at least 900 W/cm$^2$ and capable of achieving the 900 W/cm$^2$ power density rapidly (i.e., in <1 sec.). For certain glass or glass ceramic materials of particular sizes being irradiated for different time periods, the plasma-arc heat source may be at a power density less than 900 W/cm$^2$.

Figure 1B:
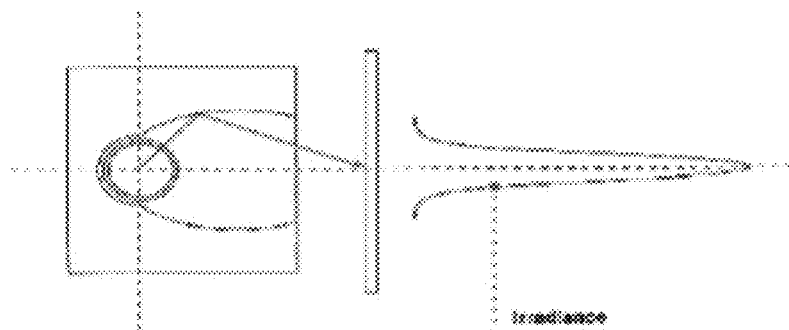
Figure 1C:
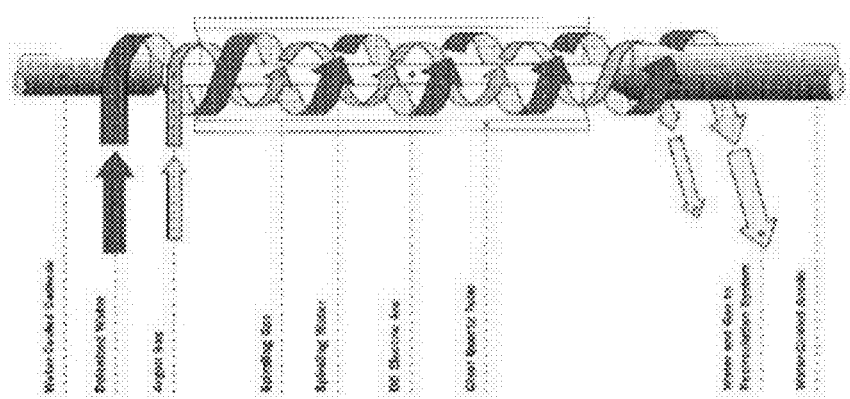
Figure 2A:
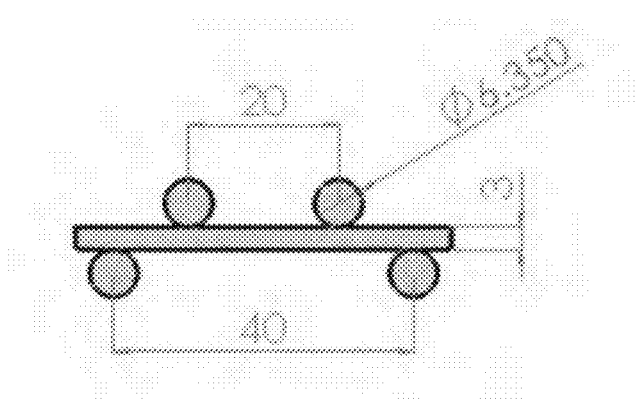
FIGS. 2a-2d are schematics illustrating the apparatus for the four-point bend load testing (dimensions in millimeters).
Figure 2B:
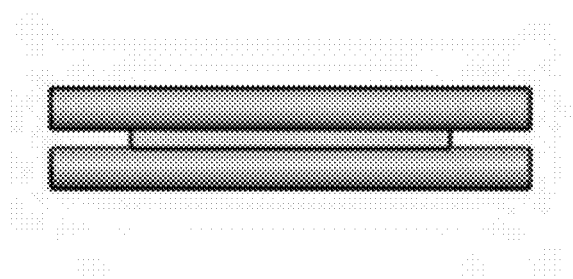
Figure 2C:
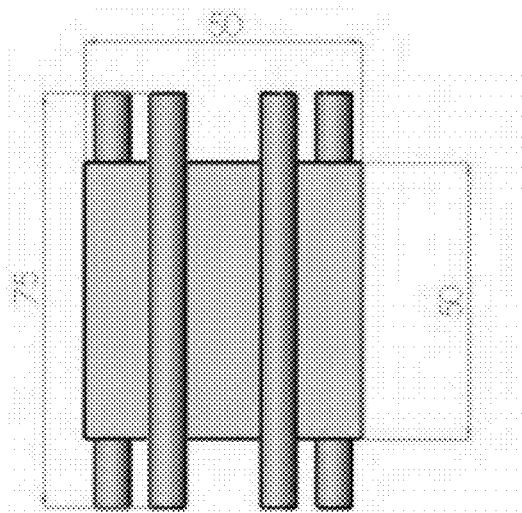
Figure 2D:
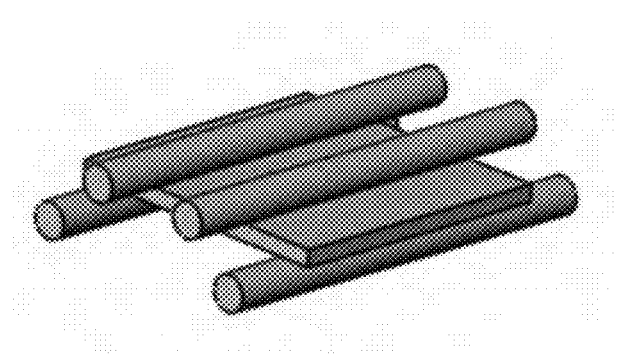
Figure 3A:
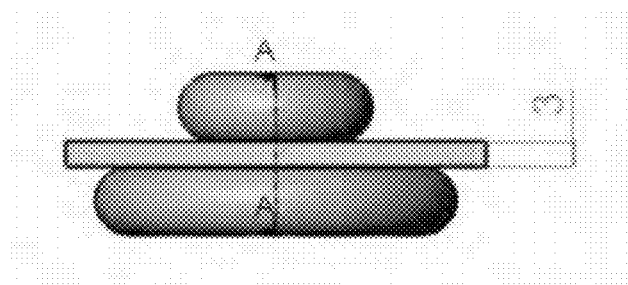
FIGS. 3a-3d are schematics illustrating the apparatus for the ring-on-ring bend testing (dimensions in millimeters).
Figure 3B:
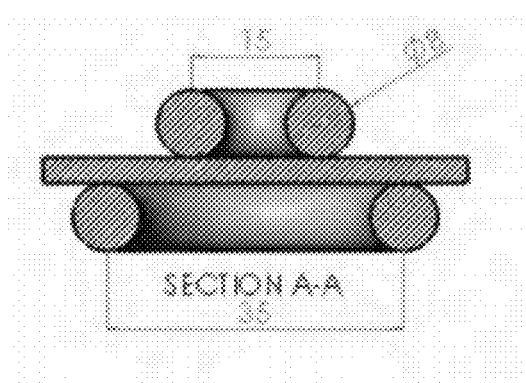
Figure 3C:
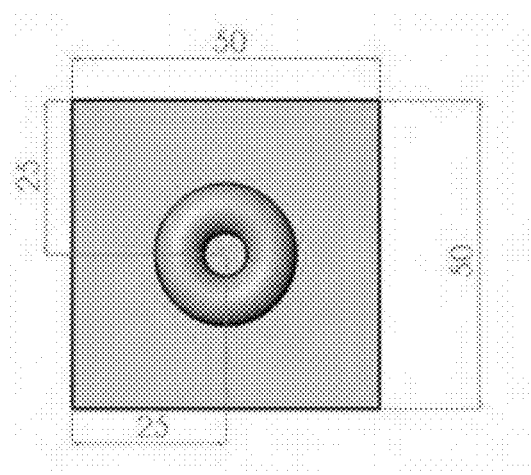
Figure 3D:
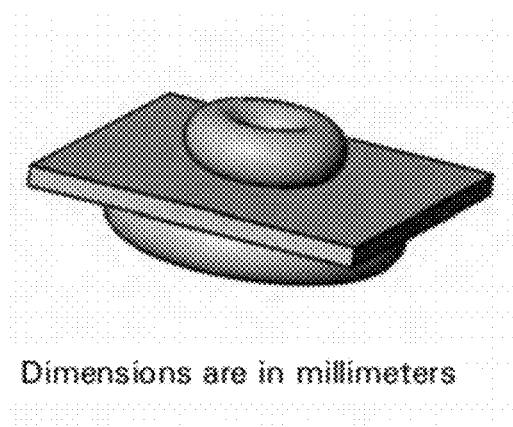

In certain embodiments (see FIGS. 1a and 1c) a controlled and contained plasma, having a temperature greater than 10,000 K, forms the basis of the heat source. A water-cooled and highly polished line focus reflector redirects the radial radiant energy output to the sample being processed (FIG. 1b). The plasma-arc heat source has an ability to provide intense heating on a surface in less than one second to produce surface flaw healing without heating or affecting the majority of the total glass material. Because the heat absorbance of the entire glass work piece cannot continue at the same level or pace as the surface of the glass using the disclosed plasma-arc heat source, non-traditional glass surface modifications are realized. In other words, because the plasma-arc heat source so rapidly produces such a high power density, it easily surpasses the ability of any or all glass or glass ceramic work pieces to absorb it, and thereby provides a strengthened product without affecting the majority of the glass or glass ceramic work piece.

Such a plasma-arc heat source is obtainable from, e.g., from Vortek in Vancouver, BC, Canada, such as a 300,000 W or a 750,000 W plasma-arc lamp, using a highly polished line focus reflector to redirect radial radiant energy output to the sample or being fixed mounted fitted with a uniform irradiance reflector, respectively. A 300,000 W heat source is capable of outputting 3.5 kW/cm$^2$. The 750,000 W plasma-arc heat source is capable of outputting 460 W/cm$^2$ over an area of 375 cm$^2$. The 750,000 W plasma-arc lamp may be sealed at the ends where the cathode and anode are located. Deionized water mixed with argon or nitrogen gas enters at the cathode side through high-velocity jets impinging at a given angle. The plasma is stable and produces a radiant spectrum from 0.2-1.5 µm. Heating rates of 2000° C./s and peak temperatures well above 3000° C. are possible.

In certain embodiments a glass, such as float soda-lime silicate, is strengthened. In certain embodiments the glass or glass ceramic material may be cleaned prior to irradiation, for example, with alcohol. A plasma-arc heat source is utilized to irradiate the glass or glass ceramic material. In certain embodiments, the heat source irradiates the glass material or glass ceramic material at a power density of 900 W/cm$^2$. The heat source is positioned to be stationary, at a standoff distance based on the size, density and type of glass or glass ceramic material being strengthened. In certain embodiments strengthening float soda-lime silicate a standoff distance of 2 cm is operable. The standoff distance will depend in part on the size, density and type of glass or glass ceramic material being treated, and is readily determinable by one of ordinary skill in the art with reference to this disclosed invention.

In some embodiments a tin-side of the glass is irradiated because the tin-side of the glass material is often weaker than the air-side of the glass material.

The glass or glass ceramic material is positioned on a surface that may be unidirectionally translated (such as via ceramic rollers) into and through a heating chamber or heating area at a speed determined on the size and type of material being treated, for example at a speed of 8 mm/s. The translation speed (and thus irradiation time period) depend in part on the size, density and type of glass or glass ceramic material being treated, and is readily determinable by one of ordinary skill in the art with reference to this disclosed invention.

The glass or glass ceramic material is irradiated for a sufficient period of time to reduce or substantially eliminate surface flaws but not so long as to cause the entire or a majority of the glass material to heat too rapidly. Glass or glass ceramic material being strengthened using the method of the invention, has a heat absorbance dependent upon its size and geometry, its emissivity (as discussed herein, patterning is accomplished with the present invention by use of, e.g., ink from black permanent pen marker that has a high), the glass density, heat capacity, and thermal conductivity. When using a plasma-arc heat source at the same power density, a smaller glass work piece will heat faster. Likewise, a glass work piece material that has a higher emissivity, a lower density, a lower heat capacity, and a lower thermal conductivity will heat faster. The determination of a suitable power density and heating time for any desired surface modification depends on all these variables, and one of ordinary skill in the art, with use of the disclosed invention will readily determine suitable heating parameters, such as power density and heat durations, for systematic and optimized strengthening of such chosen materials.

Following irradiation the glass material may be rapidly cooled using known techniques, for example via quenching with air driven through a series of outlets. The air may be directed to front and back surfaces of the glass material in a uniform manner. Other known follow-on processes may take place following the heat irradiation process. In addition, the disclosed plasma-arc heating methods may be used to controllably anneal post-processed glass. Annealing as used herein means the controlled relaxation of any processing-induced stresses, and is a known method recognized and used to improve glass performance (e.g., tempering of glass). The plasma-arc heating methods can be operated as a second stage of heating, but at lesser energy densities and for longer periods of time (i.e., promoting heating of the entire glass work piece and not just its surface) to achieve desired annealing.

The strength of heat-treated glass or glass ceramics materials strengthened using the disclosed methods, may be tested using four-point flexure and ring-on-ring flexure tests. Uniaxial flexure strength may be measured with 4-point bending from an adaptation of ASTM C1161. A semi-articulating fixture with 6.35-mm-diameter carbon-steel roller pins, a crosshead displacement rate of 0.5 mm/min, and a universal testing machine may be used. The failure stress for 4-point-bending ($S_{4pt}$) is calculated using the formula below:

$$S_{4pt} = \frac{3P(L_s - L_L)}{2bt^2}$$

where P is the failure force, $L_S$ and $L_L$ are support and loading bend spans, respectively, b is the base dimension, and t is thickness or height. A schematic of the apparatus utilized to conduct a 4-point bend test is shown in FIGS. 2a-2d. In certain embodiments of the heat treatment glass strengthening processes, the uniaxial 4-point bend failure stress increased by 65% and the equibiaxial failure stress increased by 25%. The strengthening values for certain embodiments of the disclosed processes are shown in FIGS. 4-7.

Figure 8:
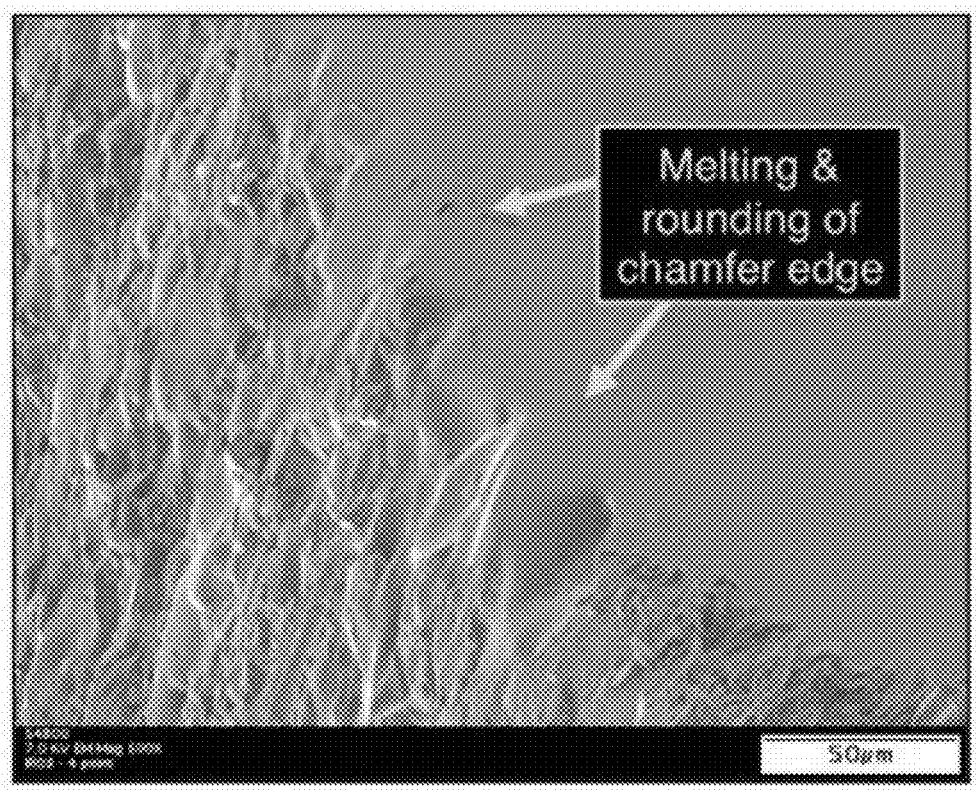
FIG. 8 is a high-magnification photographic image of a chamfered edge of a four-point-bend specimen that was treated according to an embodiment of the disclosed plasma-arc heat source strengthening methods.
Figure 9:
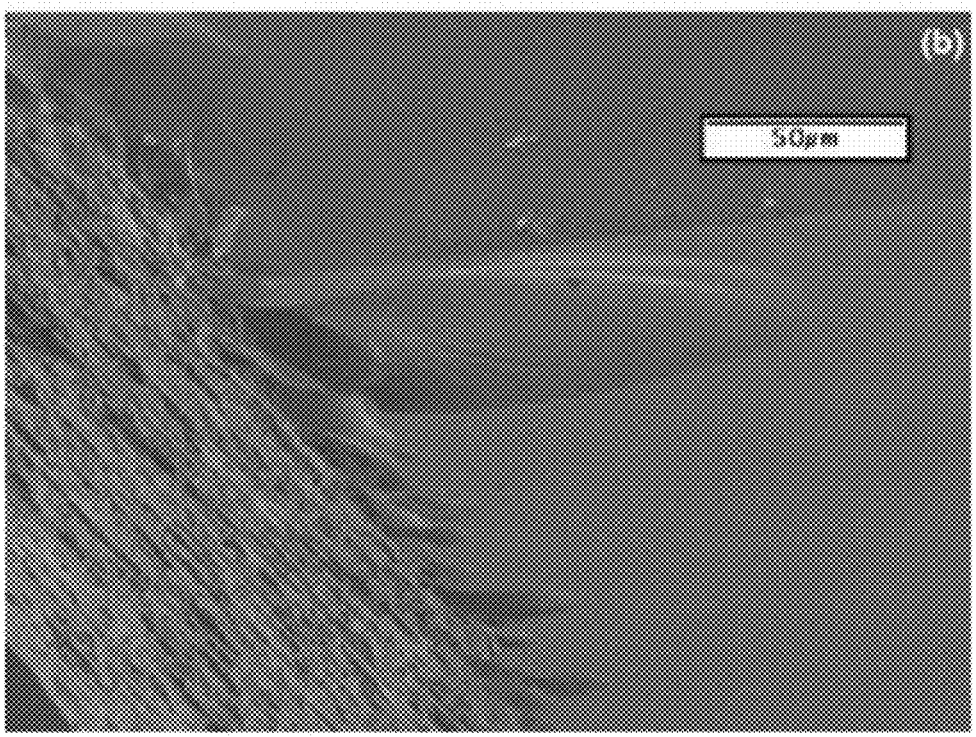
FIG. 9 is a high-magnification photographic image of an untreated specimen's chamfered edge after a four-point-bend test.

High magnification images of chamfered edges of 4-point bend tested untreated and treated glass specimens show localized softening and edge rounding, which causes strengthening and a change in the strength limiting flaw location in the treated glass of the present invention. Four-point bending of the entire glass sheet is usually an effective test to assess strength limits caused by edge-located flaws; the fracture response of untreated glass materials is an indication of such strength limiting flaws. As shown in FIGS. 8-9, untreated glass samples had failure initiate at an edge whereas the plasma-arc heating methods presently disclosed "heals" edge-located flaws as evidenced by the "rounding" that is produced at the chamfer (see FIG. 8), where failure begins at the surface. Specifically, the FIG. 8 high-magnification image of a chamfered edge of a four-point-bend glass sample plasma-arc heat treated shows localized softening and edge rounding, which strengthens the glass and changes the strength-limiting flaws locations, and the FIG. 9 high-magnification image of a chamfered edge of a four-point bend glass sample that was not treated with the present methods, showing a relatively rough chamfered edge. This change in failure mechanism results in at least a 65% increase in failure stress of glass treated using certain embodiments of the presently disclosed glass strengthening methods.

Figure 4:
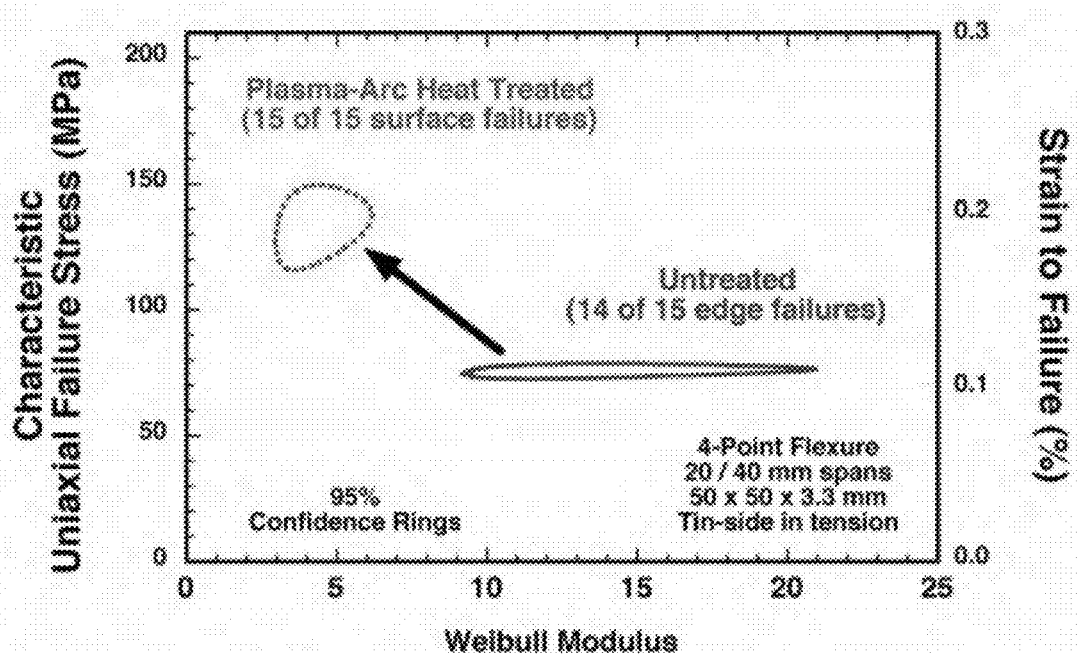
FIG. 4 is a graphic illustration of a comparison of uncensored four-point-bend failure stress distributions of untreated and plasma-arc heat source treated glass.
Figure 5:
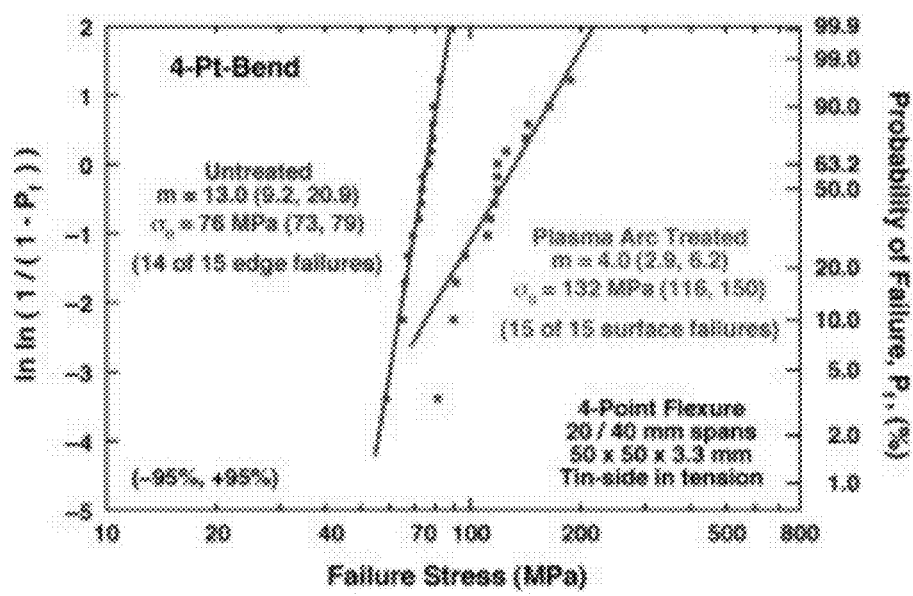
FIG. 5 is a graph comparison of uncensored and unimodal four-point-bend failure stress distributions of untreated and plasma-arc heat source treated glass.

FIGS. 4 and 5 illustrate the comparison of uncensored and unimodal 4-point bend failure stress distributions of untreated and plasma-arc heat-treated soda-lime silicate glass samples. FIG. 5 illustrates such comparison where $\sigma_\theta$ is the characteristic strength and m is the Weibull modulus. For a loading and support span of 20 and 40 mm, respectively, the effective length, Le=$L_S$((m+2)/(m+1)), is 42.9 mm for a Weibull modulus of 13, and the effective area is 516 mm² for a Weibull modulus of 3.18.

Figure 6:
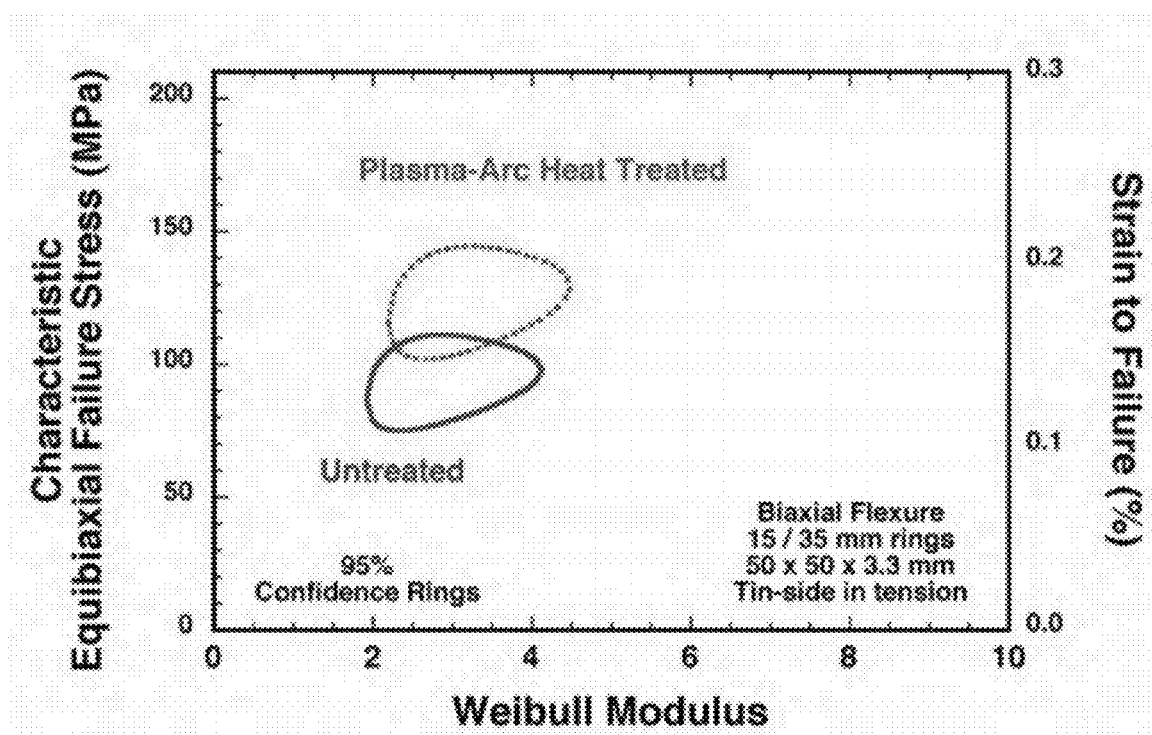
FIG. 6 is a graphic illustration of a comparison of uncensored ring-on-ring bend failure stress distributions of untreated and plasma-arc heat source treated glass.
Figure 7:
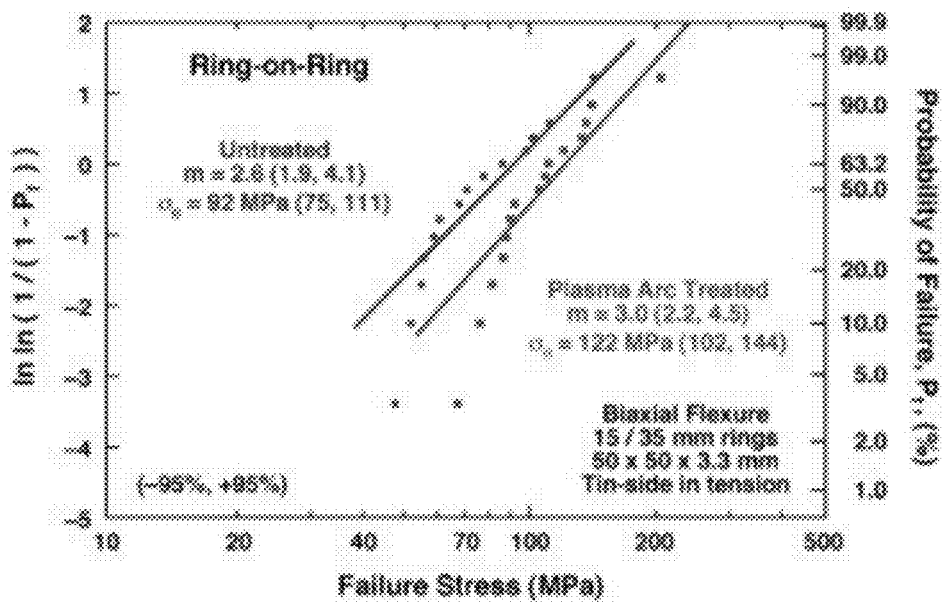
FIG. 7 is a graph comparison of uncensored and unimodal ring-on-ring bend failure stress distributions of untreated and plasma-arc heat source treated glass.

Equibiaxial flexure of entire glass sample is an effective way to examine strength limiting caused by surface-located flaws. As shown in FIG. 6, the strength of a plasma-arc heat irradiated glass increased by 25%. Examination of the strength-limiting flaws in plasma-arc heat-treated glass samples revealed a smaller flaw size (and mirror), which is associated with higher failure stress. FIGS. 6 and 7, show a comparison of uncensored and unimodal ring-on-ring bend failure stress distributions of untreated and plasma-arc heat-treated soda-lime silicate glass samples where $\sigma_\theta$ is the characteristic strength and m is the Weibull modulus. The effective area was 629 mm² for a Weibull modulus of 3 with the sampled glass and fixture size.

Equibiaxial flexure strength was measured using ring-on-ring testing as shown in FIGS. 3a-3d. A semi-articulating fixture made from carbon steel, a crosshead displacement rate of 0.5 mm/min, and a universal testing machine were used. Graphoil sheeting was used between the glass surfaces and the loading rings. The failure load was measured and recorded. The failure stress for ring-on ring ($S_{RoR}$) of a square glass plate sample was calculated using the following formulas:

$$S_{RoR} = \frac{3P}{2\pi t^2}\left[(1-v)\frac{D_S^2 - D_L^2}{2D^2} + (1+v)\ln\frac{D_S}{D_L}\right]$$

and $$D = \frac{0.5(l_1 + l_2)}{0.90961 + 0.12652\frac{t}{D_S} + 0.00168\ln\frac{0.5(l_1+l_2) - D_s}{t}}$$

where P is the failure force, t is the thickness, n is Poisson's ratio, $D_S$ is the support ring diameter, $D_L$ is the loading ring diameter, and $l_1$ and $l_2$ are the lengths of the sides of the glass plates tested. FIGS. 3a-3d are schematics illustrating the apparatus utilized for the ring-on-ring bend tests.

Figure 10:
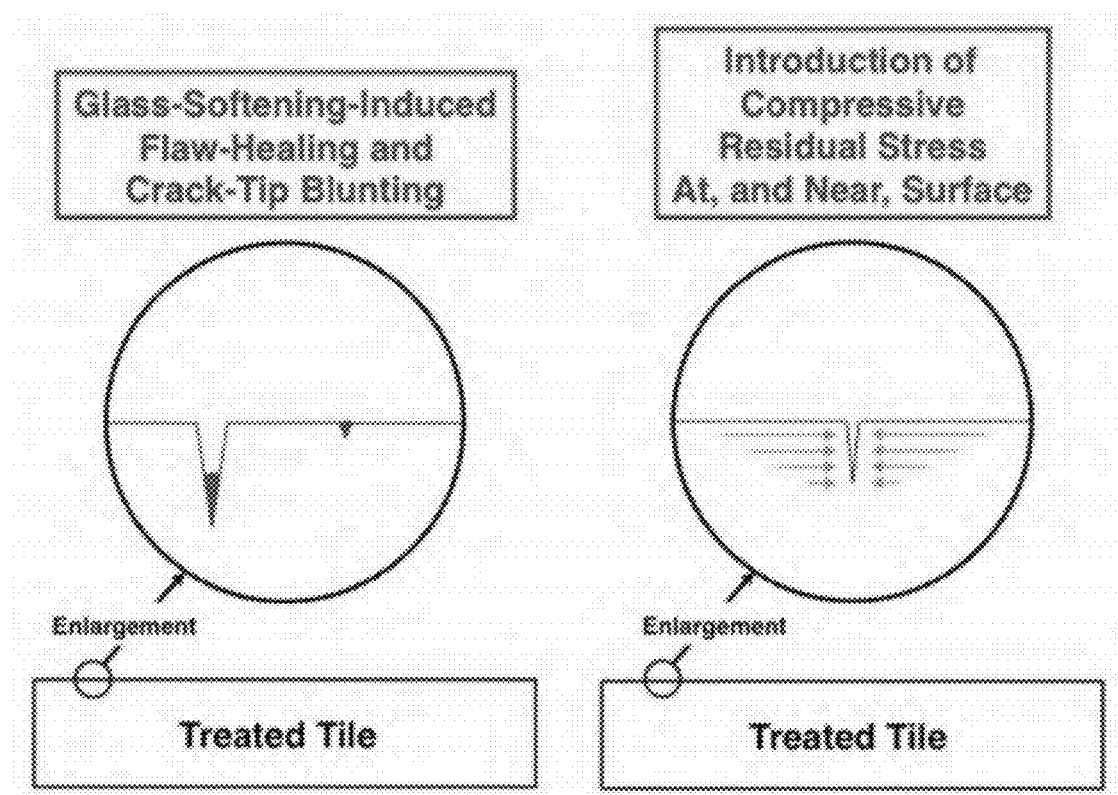
FIG. 10 illustrates possible mechanisms of the disclosed strengthening methods.

Other mechanisms activated by certain embodiments of the presently disclosed plasma-arc heat strengthening methods, which may contribute to the observed glass strengthening results, are the rounding of crack tips, filling-in and partial healing of surface flaws, and the introduction of surface-located residual compressive stresses (illustrated in FIG. 10). The "rounding" observed in FIG. 8 indicates that the filling-in or partial healing mechanism is operative. The activity of that mechanism is significant and important as it illustrates that embodiments of the disclosed plasma-arc heating methods should increase the strength of even the weakest glass materials in a glass sample population whereas commonly used chemical strengthening treatments do not appear able to do so.

Figure 11:
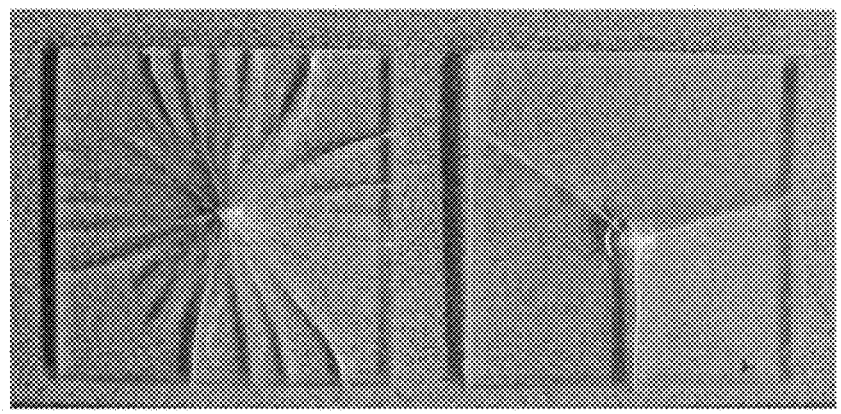
FIG. 11 are photographs of glass tile specimens following strength testing (cracking response from Hertzian indentation) with the tile on the left being treated with an embodiment of the disclosed glass-strengthening methods and the tile on the right an untreated glass specimen for comparison purposes.

The effect of embodiments of the presently disclosed plasma-arc heating methods have on Hertzian contact damage was tested by using spherical indentation on irradiated surfaces of treated and untreated glass samples. As shown in FIG. 11, the greater amount of secondary cracking (at a lower maximum force) indicates that the plasma-arc heat treatments introduced residual stresses, and that residual stresses were relieved by embodiments of the disclosed glass strengthening methods. Accordingly, the disclosed plasma-arc heat methods are effective at improving bend strength as well.

An embodiment of the disclosed plasma-arc heat methods was tested using a commercially available float soda-lime silicate glass. The density of the glass was measured to be 2.49 g/cm³. The glass samples' elastic modulus and Poisson's ratio were measured using a resonance ultrasound spectroscope and as described in the article by A. Wereszczak, "Elastic Property Determination of WC Spheres and Estimation of Compressive Loads and Impact Velocities That Initiate Their Yielding and Cracking," *Ceram. Eng. Sci. Proc.*, 27 [7] 211-23 (2006), incorporated herein by reference, were 73.1 GPa and 0.203, respectively.

The plasma-arc heat source comprised a 300 kW plasma arc heat source with a 10 cm configuration capable of delivering 3.5 kW/cm² at 100% power and was used to irradiate the glass samples. Initial heat treatment resulted in the irradiation of samples at a power density of 900 W/cm². The lamp was held stationary at a stand-off distance of 2 cm and each glass sample was set on a table that unidirectionally translated it under the lamp at a speed of 8 mm/s. Each glass sample (50 mm×50 mm×3.3 mm) was wiped clean with alcohol just before irradiation. The tin sides of 30 glass samples were irradiated in ambient air (55% RH, 231° C.).

Flexure testing was performed on the glass samples along with testing of 30 untreated glass samples. All 60 glass tiles were tested in a random order under 4-point ring-on-ring (ROR) flexure. Given the two strength test types and two glass conditions (heat treated and untreated), 15 specimens were tested with each strength-test-glass-condition combination.

Uniaxial flexure strength was measured with 4-point bending using the method described above and determined using the calculations set forth above. The failure stress for ring-on-ring was also was measured using the ROR method described above and determined using the calculations set forth above for the same. The flexure characteristic strength of the soda-lime silicate glass was found to increase. The uncensored and unimodal Weibull characteristic uniaxial 4-point bend failure stress increased by 65% and the uncensored and unimodal Weibull characteristic equibiaxial failure stress increased by 25%. These differences are shown in FIGS. 4-7 and are statistically significant.

The 4-point bending of the glass samples was an effective test to assess strength limits caused by edge-located flaws; the fracture response of the untreated glass samples (14 of 15) is an indication of this. As shown in FIG. 5, none of the 15 arc-lamp-processed glass tiles had failure initiated at an edge; failure began at the surface. This change in failure mechanism resulted in the observed 65% increase in the uncensored and unimodal Weibull characteristic failure stress of the treated glass. The arc-lamp heating used served to "heal" edge-located flaws as evidenced by the "rounding" that was produced at the chamfer (see FIG. 8).

Equibiaxial flexure of the glass samples is useful for examining the strength limiting caused by surface-located flaws. As shown in FIG. 7, the uncensored and unimodal Weibull strength of the plasma-arc heat source irradiated glass increased by 25%. Examinations of the strength-limiting flaws in some of the heat-treated glass samples revealed a smaller flaw size (and mirror), which is associated with higher failure stress. In addition to an improvement in characteristic failure stress, the plasma-arc heat treatment optimally improved the minimum strength of the glass for both four-point and equibiaxial flexure testings. The weakest plasma-arc heat-treated specimen was nearly equivalent to the strongest untreated specimen in four-point bending as can be seen in FIG. 5, and the weakest heat-treated glass sample was stronger than one-third of the untreated glass samples in equibiaxial flexure (FIG. 7).

Although uncensored and unimodal Weibull statistics were determined (i.e., a single two-parameter Weibull distribution fit) to facilitate rudimentary strength-change interpretations, three of the four data sets shown in FIGS. 5 and 7 are not well represented by a straight line, indicating that multiple strength-limiting flaw types were operative in these three sets, and that the downward turn in their data (i.e., an apparent increase in the Weibull modulus) for lower failure stresses indicates that they were exclusive flaw populations.

In another aspect of the disclosed methods, a plasma-arc heat source is used for patterned surface modification using a screen-printed ink (or other similar compositions) on glass and glass ceramic materials. Methods, other than or in addition to screen printing, can be used to controllably deposit the ink or paste pattern (e.g., decals, jet printing, etc.). The use of the plasma-arc heat source results in permanent embedding of a pattern on a glass or glass ceramic surface where patterned (see FIG. 13). A plasma-arc heat source capable of producing at least 900 W/cm$^2$ may be used to perform the disclosed patterning methods. For certain inks or pastes and glass or glass ceramic materials, a suitable plasma-arc heat source may be at a power density less than 900 W/cm$^2$. The determination of a suitable power density and irradiation time period for any desired patterning using the currently disclosed plasma-arc heat source methods depends on the ink or paste composition used (for example, its emissivity), the type of glass or glass ceramic material being irradiated and like variables, and are readily determinable by one of ordinary skill in the art, with use of the disclosed invention.

In certain embodiments, the ink or paste used has a relatively high emissivity (i.e., preferentially absorbed light) and evolves off as a consequence of the high-temperature exposure when irradiated. For example graphitic inks may be used, carbon-based inks may be used or like compositions. Good results have been obtained using permanent pen ink, such as a SHARPIE® black-ink pen. The pattern may be screen printed or otherwise patterned onto a glass surface or edge (see FIGS. 16 and 17).

Figure 16:
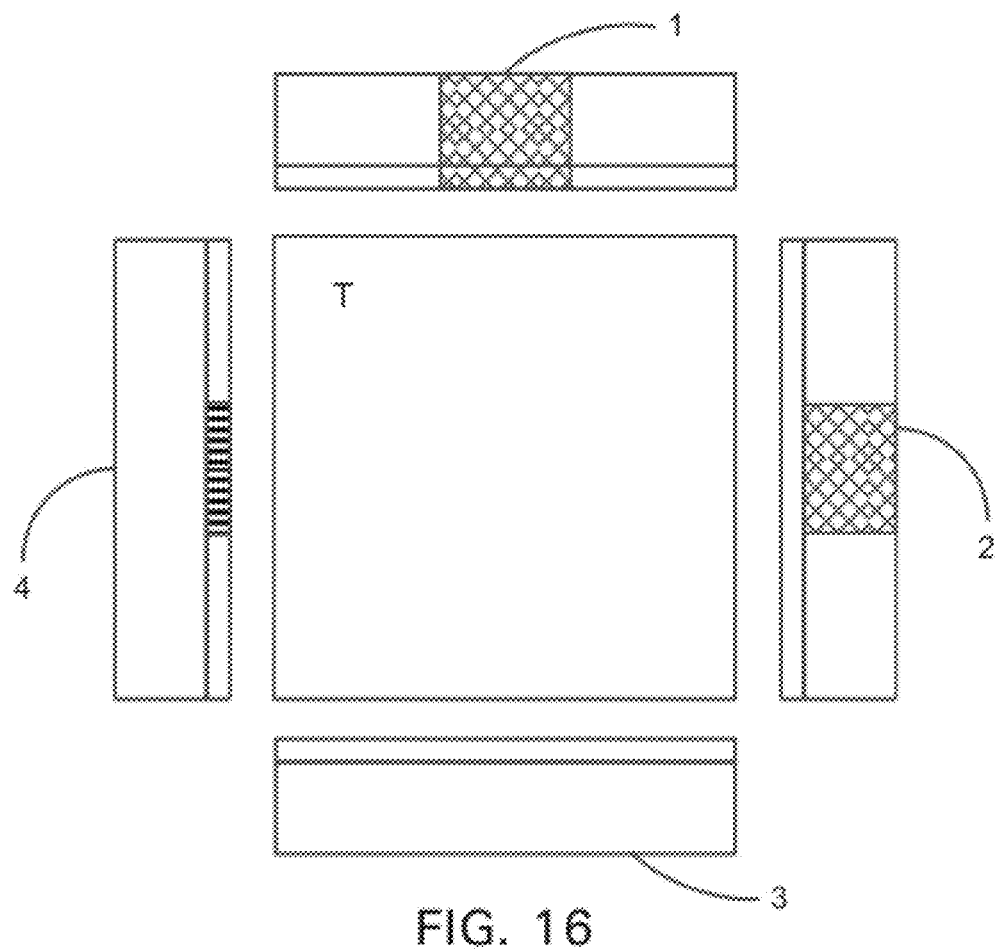
FIG. 16 is a drawing illustrating the effect of an embodiment of the glass patterning methods disclosed.
Figure 17:
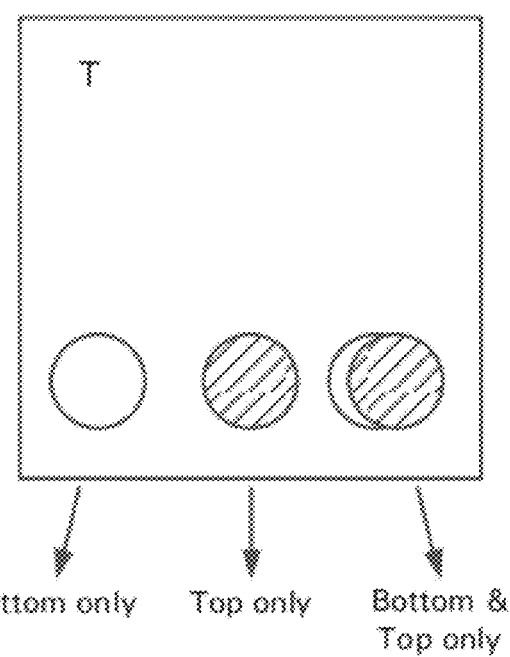
FIG. 17 is a drawing illustrating the effect of an embodiment of the glass patterning methods disclosed.

In FIG. 16, the glass samples are marked on (1) the bevel and side, (2) the side only, (3) no markings and (4) on the bevel only using ink from a permanent blank ink pen, such as a SHARPIE® black-ink pen. All markings form a permanent and raised pattern of glass when irradiated with a plasma-arc heat source at a power density of 900 W/cm$^2$, while the glass was translated under the heat source at a speed of 8 mm/s. As shown in FIG. 17, the three different glass surface markings were made and the glass irradiated with the same plasma-arc heat source at a power density of 900 W/cm$^2$, while the glass was translated under the heat source at a speed of 8 mm/s. All marks produced a permanent pattern in the glass but not all of equivalent or prominent as one another.

Figure 12:
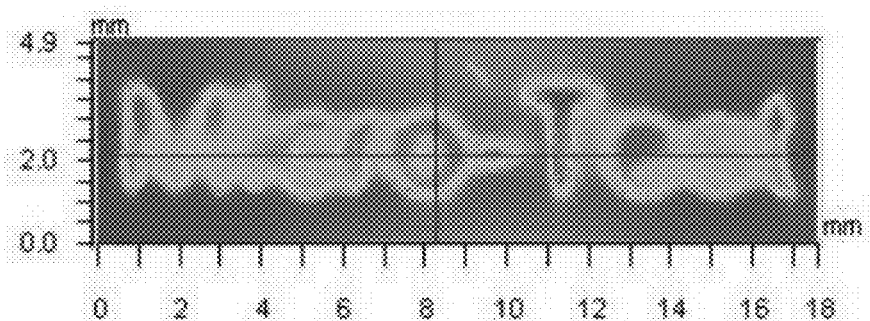
FIG. 12 is a graphic image of a pattern formed on a glass surface providing dimensions of the resulting pattern.
Figure 13:
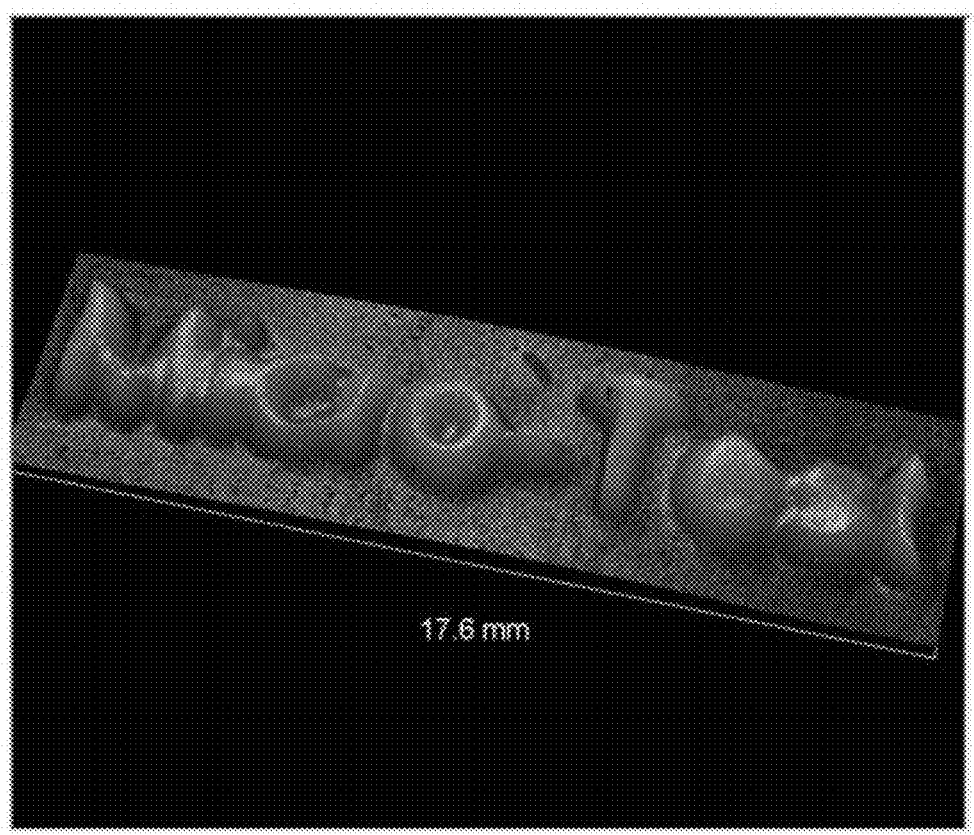
FIG. 13 is a photographic image of the pattern shown in FIG. 12 produced on the surface of a glass specimen after plasma-arc heat source irradiation.
Figure 14:
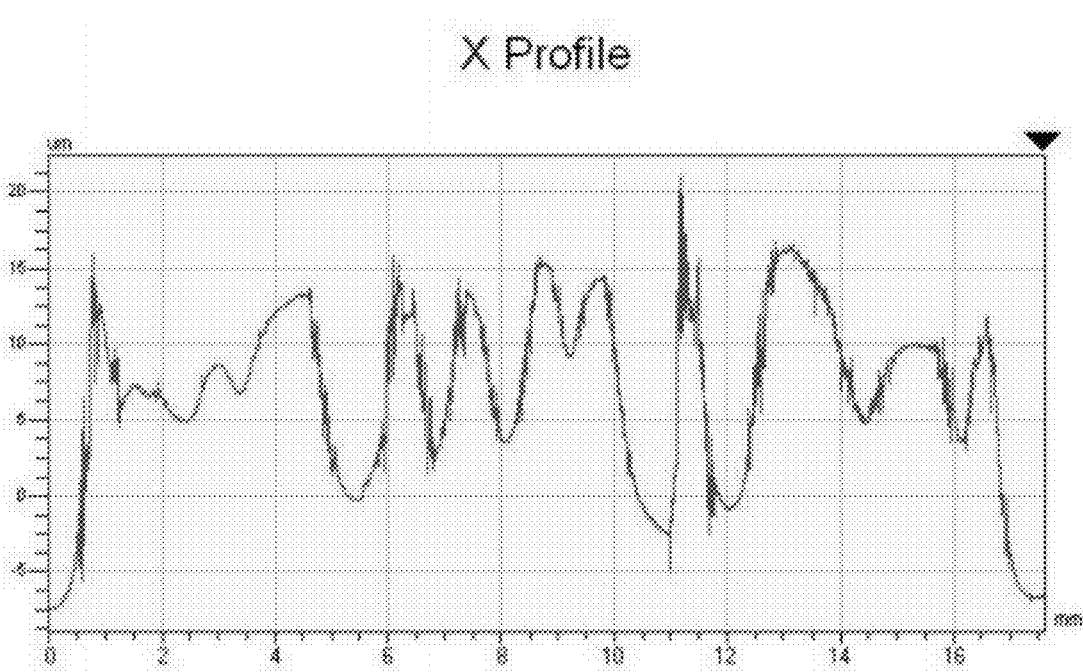
FIGS. 14 and 15 are X- and Y-profiles, respectively, of the pattern shown in FIG. 13.
Figure 15:
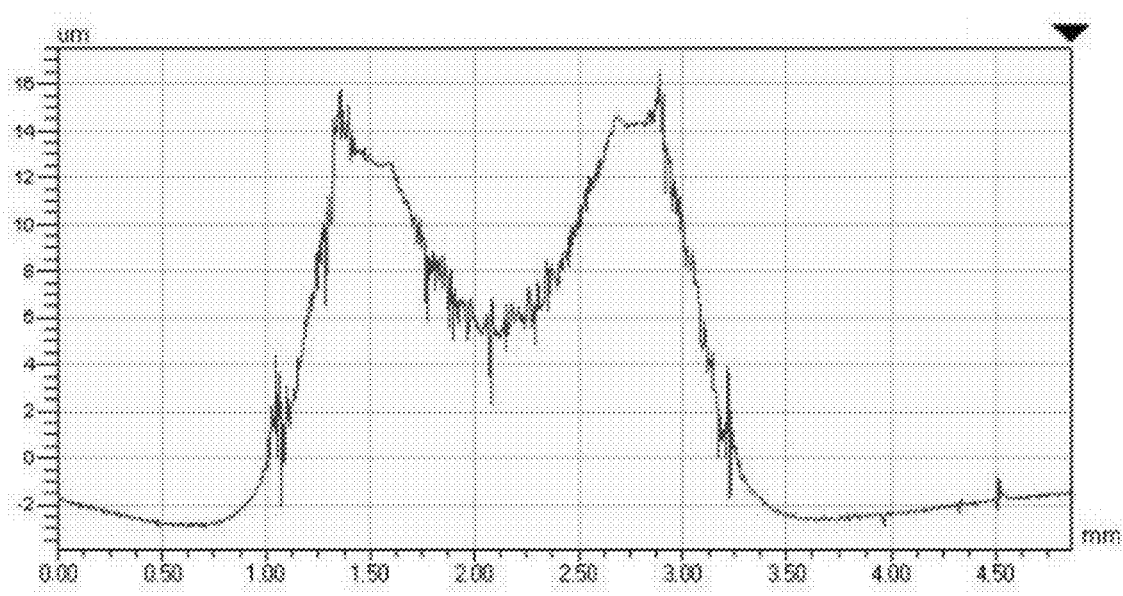

The irradiated glass produces a patterned design on the glass surface (FIG. 13). Without adhering to a particular theory, it is speculated that the ink or paste patterned onto the glass surface acts to absorb the heat, thereby heating the glass surface immediately under the ink or paste, causing the glass to soften while the ink or paste evolves. In other words, the ink or paste heats up extremely rapidly (relatively to the transparent substrate) without degrading or significantly altering the (substrate) glass. The result is a permanent embossing of the patterned design on the glass surface (see FIGS. 12-15). In FIG. 13 the characteristics were as follows: Ra: 5.12 μm; Rq: 6.15 μm; Rt: 34.98 μm with a magnification of the image of 1.36, measurement mode VSI, and sampling 4.75 μm. In FIG. 14, showing the X profile of FIG. 12, the characteristics were as follows: Ra: 4.63 μm; Rq: 5.79 μm; Rt: 28.48 μm; Rp: 20.93 μm; and Rv: −7.56 μm and an angle of 51.87 urad, curve of −5.71 m, an average pattern height of 6.82 μm and an area of 0.12 mm$^2$. In FIG. 15, showing the Y profile of FIG. 12, the characteristics were as follows: Ra: 5.59 μm; Rq: 6.13 μm; Rt: 19.49 μm; Rp: 16.54 μm; and Rv: −2.59 μm and an angle of 60.76 urad, curve of −0.2. m, an average pattern height of 2.89 μm and an area of 0.01 mm$^2$.

This process is not restricted to graphitic inks or carbon-based inks or pastes. Any functional ink or pastes can be deposited the glass surface and be permanently bonded (embossed) on the glass surface may be utilized. The process is not limited to glass but may be used for glass ceramics or ceramic materials as long as the process temperature and/or process time of the ink or paste is less than or equivalent to the temperature and/or time, respectively, where the glass (or glass-ceramic or ceramic) surface is affected by the plasma heating.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method comprising:
   strengthening an untreated glass sample by;
   providing a soda-lime silicate glass have a first surface comprising a tin side, a second surface comprising an air side and edges;
   providing a plasma-arc heat source capable of delivering a power density of at least 900 W/cm² in less than one second;
   unidirectionally translating the glass under the plasma-arc heat source at a speed of 8 mm/s;
   irradiating the first surface of the glass with the plasma-arc heat source at a power density of 900 W/cm²; and
   quenching the glass following irradiation;
   thereby increasing an equibiaxial failure stress of the untreated glass by 25% or more and a uniaxial 4-point-bend failure stress of the untreated glass by 65% or more.

2. The method of claim 1 further comprising annealing the strengthened glass using the plasma-arc heat source for a second stage of heating.

3. A method comprising:
   patterning a glass sample by;
   providing a soda-lime silicate glass have a first surface, a second surface and edges;
   forming a first pattern of graphitic ink on the first surface of the glass using a screen printing method;
   providing a plasma-arc heat source capable of delivering a power density of at least 900 W/cm² in less than one second;
   unidirectionally translating the glass under the plasma-arc heat source at a speed of 8 mm/s; and
   irradiating the first surface of the glass with the plasma-arc heat source at a power density of 900 W/cm² and substantially simultaneously evolving the ink thereby forming a second pattern on the first surface of the glass wherein the second pattern comprises a glass material raised from the first surface of the glass, the second pattern corresponding to the first pattern.

4. The method of claim 3 wherein the graphitic ink comprises permanent black pen ink.

5. A method comprising:
   patterning a glass or glass ceramic sample by forming a first pattern of ink on a first surface of the glass; and
   irradiating the first surface of the glass with a plasma-arc heat source at a power density of 900 W/cm² thereby forming a second pattern on the first surface of the glass wherein the second pattern comprises a glass material raised from the first surface of the glass, the second pattern corresponding to the first pattern.

6. The method of claim 5 wherein the ink is controllably patterned onto the glass or glass ceramic sample.

7. The method of claim 5 further comprising unidirectionally translating the glass under the plasma-arc heat source at a speed of 8 mm/s.

8. The method of claim 5 wherein the glass comprises a silicate glass.

9. The method of claim 5 wherein the ink comprises black pen ink.

10. The method of claim 5 wherein the second pattern comprises a glass material having a different density value than that of the non-raised, unpatterned glass.

11. The method of claim 5 wherein the second pattern comprises a glass material raised from the first surface of the glass such that the pattern is visible to the naked eye.

12. The method of claim 5 wherein the second pattern comprises a glass material raised from the first surface of the glass at a height such that the pattern is capable of detection by touching the glass surface.

13. The method of claim 5 wherein the second pattern comprises a UPC code, a part number and/or a word.

14. The method of claim 5 wherein the second pattern comprises a raised glass material integral with glass material at the first surface.

* * * * *